United States Patent [19]

Kozuka

[11] Patent Number: 5,018,757
[45] Date of Patent: May 28, 1991

[54] STEERING ANGLE CONTROL APPARATUS FOR VEHICLE

[75] Inventor: Hajime Kozuka, Okazaki, Japan

[73] Assignee: Mitsubishi Jidosha Kogyo Kabushiki Kaisha, Tokyo, Japan

[21] Appl. No.: 530,616

[22] Filed: May 30, 1990

[30] Foreign Application Priority Data

Jun. 5, 1989 [JP] Japan .................. 1-142727
Dec. 4, 1989 [JP] Japan .................. 1-315098

[51] Int. Cl.⁵ .............................................. B60G 7/00
[52] U.S. Cl. ................................. 280/96.1; 280/661; 280/673; 280/675; 280/691
[58] Field of Search ............... 280/96.1, 660, 661, 280/673, 674, 667, 668, 690, 691, 696, 675

[56] References Cited

U.S. PATENT DOCUMENTS

| | | | |
|---|---|---|---|
| 4,556,238 | 12/1985 | Matschinsky | 280/673 |
| 4,744,586 | 5/1988 | Shibahata et al. | 280/691 |
| 4,822,073 | 4/1989 | Tanahashi et al. | 280/691 |
| 4,842,295 | 6/1989 | Hawkins | 280/690 |
| 4,842,297 | 6/1989 | Takahashi | 280/691 |
| 4,903,981 | 2/1990 | Alesso et al. | 280/661 |

Primary Examiner—Charles A. Marmor
Assistant Examiner—Tamara L. Finlay
Attorney, Agent, or Firm—Hedman, Gibson, Costigan & Hoare

[57] ABSTRACT

A steering control apparatus for a vehicle includes a rockable auxiliary link for connecting an knuckle arm of a knuckle and the outer end of a tie rod of a steering unit to each other so that the relative position therebetween is variable. A rotor is rotatably mounted on the knuckle. A vehicle height detection link is connected between the rotor and a lower arm of a suspension of the vehicle so as to rotate the rotor in accordance with changes in the vertical stroke of the suspension. A control link is connected between the rotor and the auxiliary link so as to rock the auxiliary link in response to the rotation of the rotor, thereby changing the distance between the outer end of the tie rod and the steering axis of the knuckle.

18 Claims, 14 Drawing Sheets

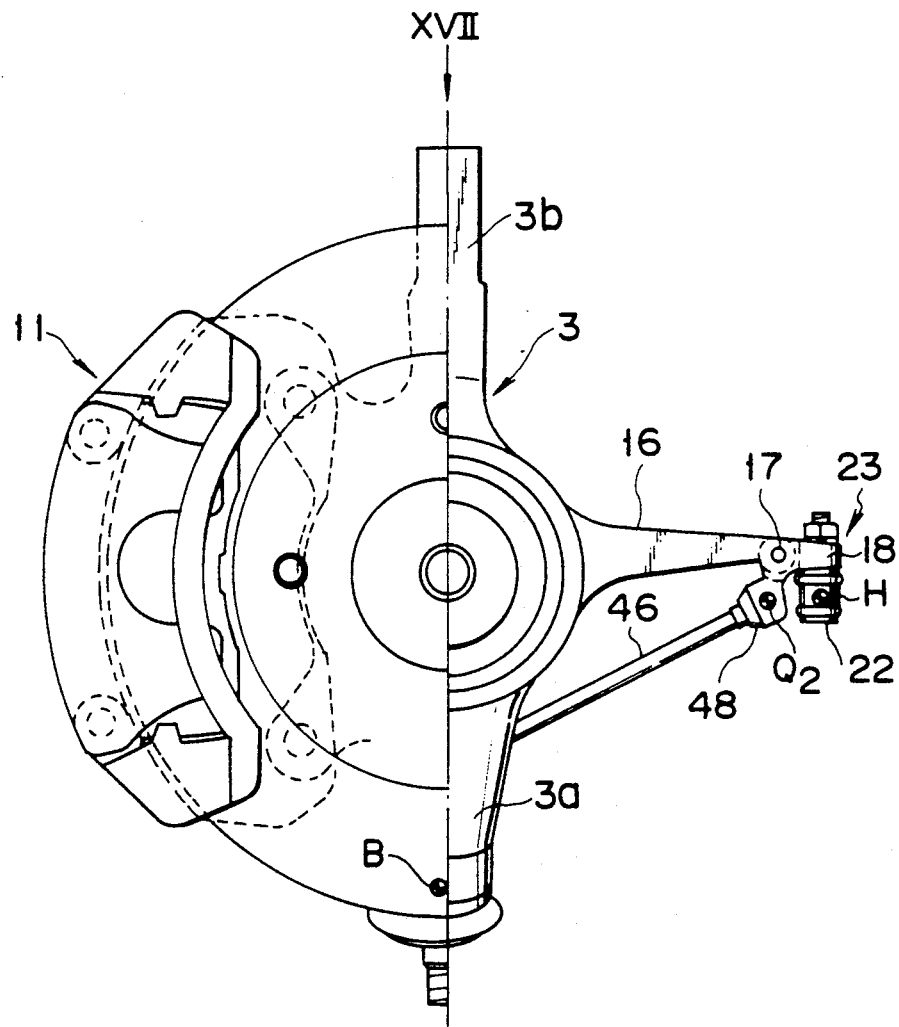
F I G. 16

STEERING ANGLE CONTROL APPARATUS FOR VEHICLE

BACKGROUND OF THE INVENTION

1. Field of the Invention

The present invention relates to a steering angle control apparatus for a vehicle, for controlling the turning angle of the wheels which is caused in response to the steering output from tie rods of a steering unit.

2. Description of the Related Art

An apparatus disclosed in Published Unexamined Japanese Patent Application No. 64-22611 is known as a steering angle control apparatus of this type. In this example, the mounting positions of suspension arms on a vehicle body are displaced in the width direction of the vehicle in accordance with the vehicle speed and the turning angle of the wheels. When the turning angle is large, the suspension arm connected to the inside wheel is displaced outward in the width direction of the vehicle body, thereby increasing the maximum turning angle of the inside wheel. Therefore, the minimum turning diameter of the vehicle can be reduced.

In the conventional control apparatus described above, the mounting positions of the suspension arms on the vehicle body are displaced in the width direction of the vehicle body by means of an actuator. For this reason, the suspension mechanism as a whole must be displaced in this direction, so that large control force is required for displacing the arm mounting positions, thereby making the apparatus bulky.

In addition, since the arm mounting positions are controlled in accordance with the vehicle speed and the turning angle of the wheels, characteristics of the wheel alignment with respect to the vertical movement of the suspensions greatly change in response to the position control, and stable suspension performance cannot be assured.

SUMMARY OF THE INVENTION

The present invention has been contrived in consideration of the above circumstances, and its object is to provide a compact steering angle control apparatus which can control the turning angle of the wheels without degrading suspension performance.

In order to achieve the above object, according to the present invention, there is provided a steering angle control apparatus comprising a knuckle for supporting a wheel to be rotatable, the knuckle being supported on a vehicle body through a suspension mechanism, a changing mechanism, connected between an outer end of a tie rod of a steering unit and a knuckle arm of the knuckle, for changing the position of the outer end of the tie rod relative to the knuckle, and control means for actuating the changing mechanism in response to changes in the vertical stroke of the suspension mechanism.

With the steering angle control apparatus having the above arrangement, between the outer end of the tie rod and the knuckle arm is provided the changing mechanism for changing the position of the outer end of the tie rod relative to the knuckle. Therefore, the substantial length of the knuckle arm, the substantial angle of the knuckle arm on the horizontal plane, or the substantial length of the tie rod can be changed by the operation of the changing mechanism. More specifically, when the relative position of the outer end of the tie rod changes in a direction perpendicular to the steering axis (i.e., a king pin axis of the suspension mechanism) of the knuckle, the substantial length of the knuckle arm varies. When the relative position of the outer end of the tie rod changes around the steering axis, the angular position of the knuckle arm varies. When the relative position of the outer end of the tie rod is displaced in a direction parallel to the steering axis, the substantial length of the tie rod is changed. When displacement of the outer end of the tie rod relative to the knuckle occurs, the turning angle of the wheel varies. Therefore, by controlling the operation of the changing mechanism, the turning angle of the wheels can be controlled.

The changing mechanism is operated by the control means in response to the vertical movement of the suspension mechanism. Therefore, the substantial length of the knuckle arm, the substantial angular position of the knuckle arm, or the substantial length of the tie rod is changed in accordance with changes in the vertical stroke of the suspension mechanism, thereby controlling the turning angle of the wheel.

As described above, according to the present invention, the turning angle of the wheels, which is caused in response to the tie rod output, is controlled by changing the position of the outer end of the tie rod relative to the knuckle. Thus, the suspension mechanism need not be displaced as a whole, so that the control apparatus can be made compact. In addition, since the turning angle of the wheels is controlled in accordance with changes in the vertical stroke of the suspension mechanism, alignment change characteristics of the suspension mechanism as a function of the vertical stroke can be stabilized, and stable suspension performance can be assured.

Since the turning angle of the wheels is changed in accordance with changes in the vertical stroke of the suspension mechanism, the toe-angle of the wheels can be controlled in accordance with changes in the vertical stroke of the suspension mechanism. Thus, the toe-angle characteristics, which greatly influence steering stability in a neutral position of the wheels or at their small turning angles, can be easily improved.

The maximum wheel-turning angle of the vehicle must be of such a value that an optimal gap S is provided between the vehicle body b, e.g., the chassis frame, and each wheel a turned by that maximum angle, as is illustrated in FIG. 18. In general, the maximum wheel-turning angle is set such that the wheels a turned by this angle do not hit against the body b even when the suspension stroke becomes long, thus tilting the wheels toward the vehicle body and reducing the gap S. Hence, when the suspension is put in the neutral state, the wheels can be turned by a relatively large angle. In other words, the maximum angle can be set large. If the maximum angle is set to the limit value with reference to the neutral state of the suspension, however, the wheels a will contact the vehicle body b when the suspension stroke increases excessively as the vehicle body b jumps up or down.

According to a preferred arrangement of the present invention, to prevent the wheels a from contacting the body b, a changing mechanism and control means are used. The changing mechanism and the control means reduce the turning angle, which is caused by the output of the tie rod, in inverse proportion to an increase in the suspension stroke, when the suspension stroke is near its maximum. Therefore, the wheels a do not hit against the body b even if the maximum wheel-turning angle is of a value optimal for any stroke that the suspension may assume while it remains in the neutral position, and even if the suspension stroke changes greatly while the wheels are turned by the maximum angle of said specific value. Therefore, the maximum turning angle, which is optimal for the suspension in the neutral state, can be set to be large, and the minimum turning diameter of the vehicle in a practical range can be efficiently reduced.

According to another preferred arrangement, the outer end of a tie rod is apart backward from the steering axis of the knuckle, and the changing mechanism and the control means are constructed so as to increase the distance between the steering axis of the knuckle and the outer end of the tie rod in accordance with an increase in the vertical movement of the suspension mechanism. With the above arrangement, the maximum turning angle of the wheel in the neutral state of the suspension mechanism can be set to be large. At the same time, the toe-angle characteristics as a function of the suspension stroke, in the neutral position of the wheel or at its small turning angle, can be corrected toward the toe-in side, thereby efficiently improving steering stability of the vehicle.

As described above, the present invention has an advantage in that the turning angle of the wheel and the toe-angle thereof can be efficiently controlled in accordance with changes in the vertical stroke of the wheel by a compact and simple arrangement. Therefore, there be provided a steering angle control apparatus which can reduce the minimum turning diameter of the vehicle to improve turning performance of the vehicle, and which can suppress changes in toe upon the vertical movement of the wheel to easily improve steering stability.

The above and other objects, features, and advantages of the present invention will be apparent from the following detailed description in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 10 show a steering angle control apparatus according to a first embodiment of the present invention, in which FIG. 1 is a rear view of the apparatus including a suspension mechanism;

FIG. 2 is a partially cut away side view of the apparatus viewed along an arrow II in FIG. 1;

FIG. 3 is a partially cut away side view of the apparatus viewed along an arrow III in FIG. 2;

FIG. 4 is a schematic view showing the entire apparatus;

FIG. 5 is a longitudinal sectional view showing a connecting structure between a knuckle arm and an auxiliary link;

FIG. 6 is a sectional view taken along a line VI-VI in FIG. 5;

FIG. 7 is a schematic view showing a positional relationship between a rotating shaft of a rotor and first and second ball joints;

FIG. 8 is a longitudinal sectional view showing the structure of a seal portion of the rotating shaft;

FIG. 9 is a sectional view showing an essential part of a joint portion of a control link; and FIG. 10 is a graph showing toe changes as a function of the vertical stroke of the suspension;

FIGS. 11 to 14 show a steering angle control apparatus according to a second embodiment of the present invention, in which FIG. 11 is a rear view showing the apparatus including a suspension mechanism;

FIG. 12 is a partially cut away side view of the apparatus viewed along an arrow XII in FIG. 11;

FIG. 13 is a partially cut plan view of the apparatus viewed along an arrow XIII in FIG. 12; and FIG. 14 is a perspective view schematically showing the apparatus; and FIGS. 15 to 17 show a steering angle control apparatus according to a third embodiment of the present invention, in which FIG. 15 is a rear view showing the apparatus including a suspension mechanism;

FIG. 16 is a partially cut away side view of the apparatus viewed along an arrow XVI in FIG. 15; and FIG. 17 is a partially cut away plan view of the apparatus viewed along an arrow XVII in FIG. 16.

DETAILED DESCRIPTION OF THE PREFERRED EMBODIMENTS

Preferred embodiments of the present invention will now be described in detail with reference to the accompanying drawings.

Figure 1:
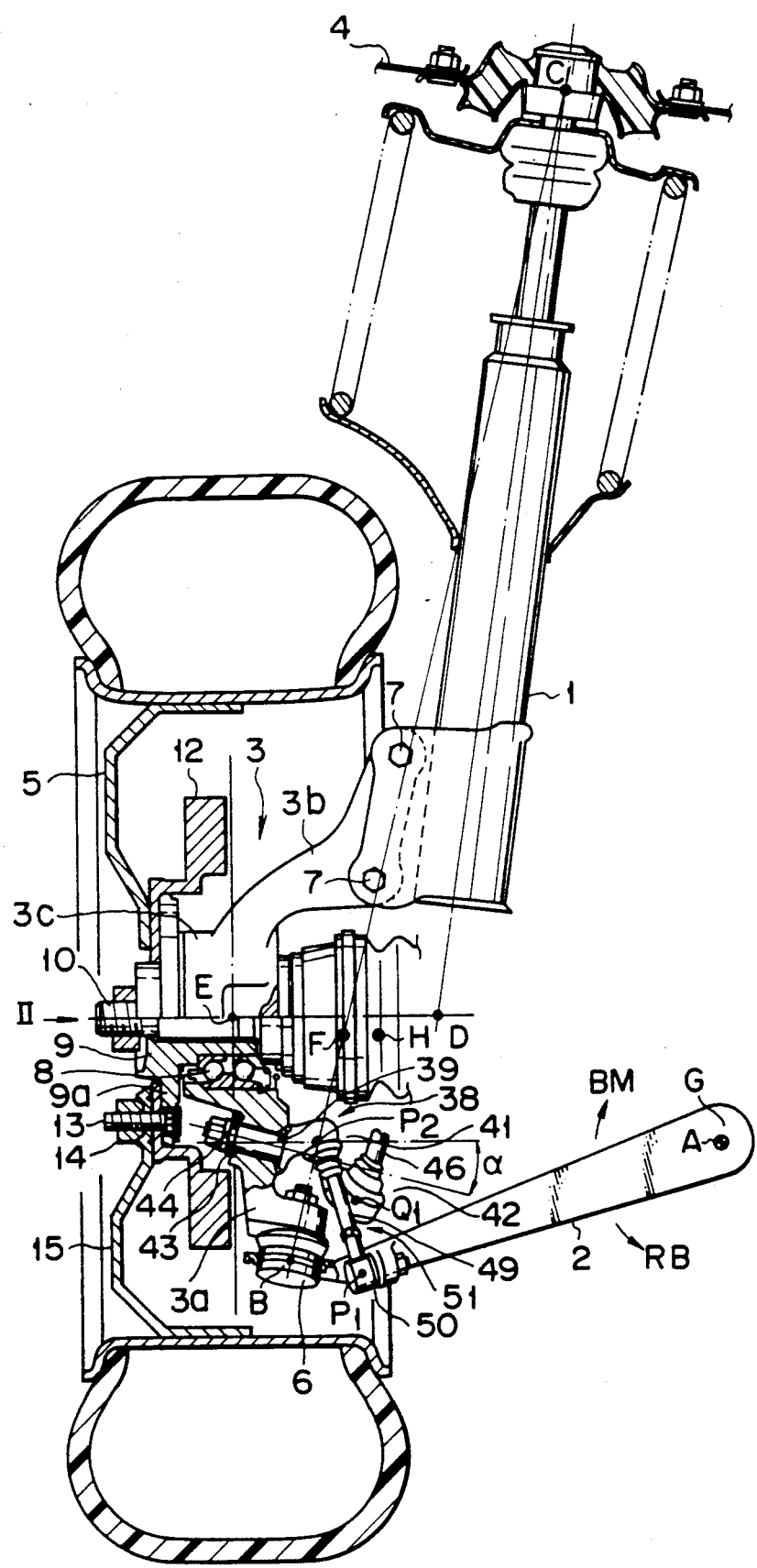

FIG. 1 shows either strut type front suspension mechanism of a vehicle, which has a steering angle control apparatus according to an embodiment of the present invention. In this suspension mechanism, a knuckle 3 is supported by a strut assembly 1 and a lower arm 2 to be vertically displaceable with respect to a vehicle body 4 within a predetermined stroke. An upper end of the assembly 1 is rotatably supported on the vehicle body 4, and an inner end of the lower arm 2 is rotatably mounted on the vehicle body 4. The knuckle 3 rotatably supports a front wheel 5. A lower arm portion 3a of the knuckle 3 is supported by the outer end of the lower arm 2 through a ball joint 6, and an upper arm portion 3b of the knuckle is fixed to the lower end of the strut assembly 1 through a pair of bolts 7. Reference symbol A in FIG. 1 denotes the center of rotation of the inner end of the lower arm 2, which is mounted on the vehicle body; B, the center of rotation of the ball joint 6; and C, the center of rotation of the connecting portion between the vehicle body 4 and the strut assembly 1. The knuckle 3 is supported to be swivelable about a king pin axis extending through the centers C and B.

Figure 2:
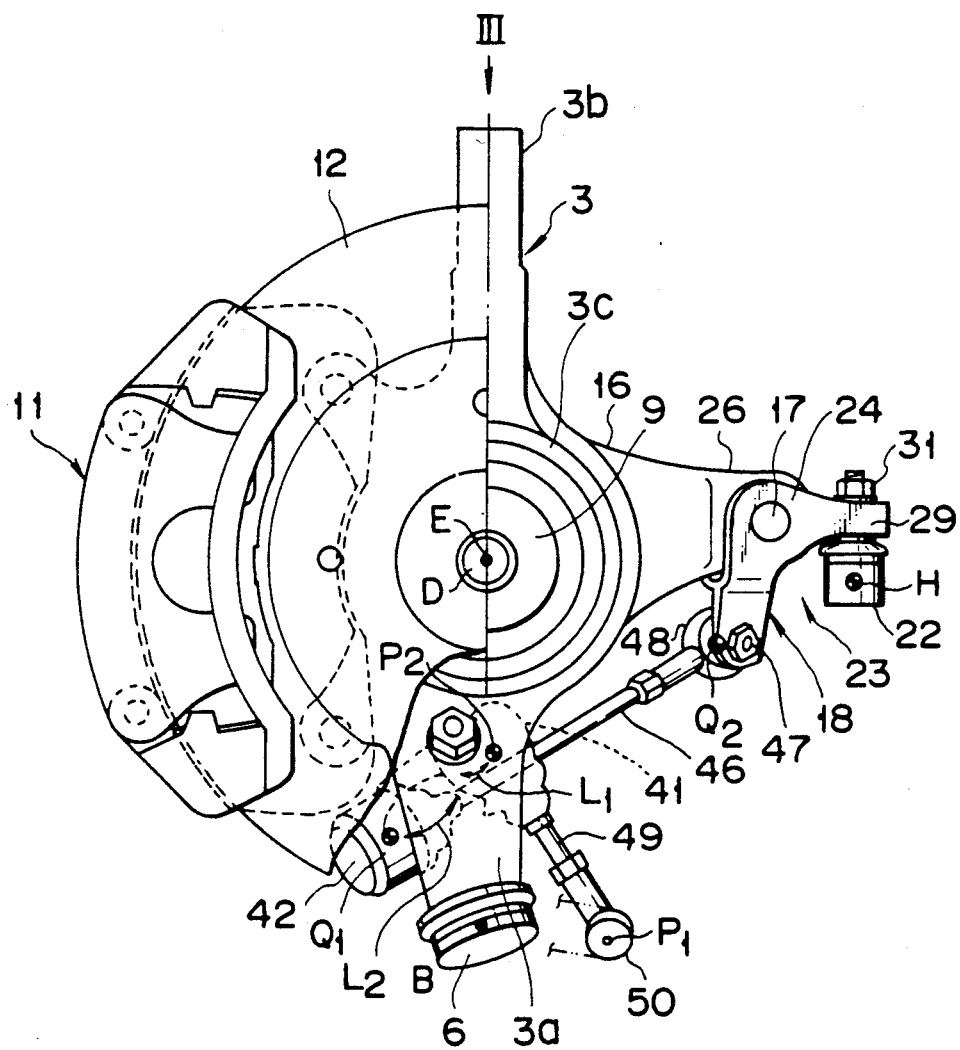
Figure 3:
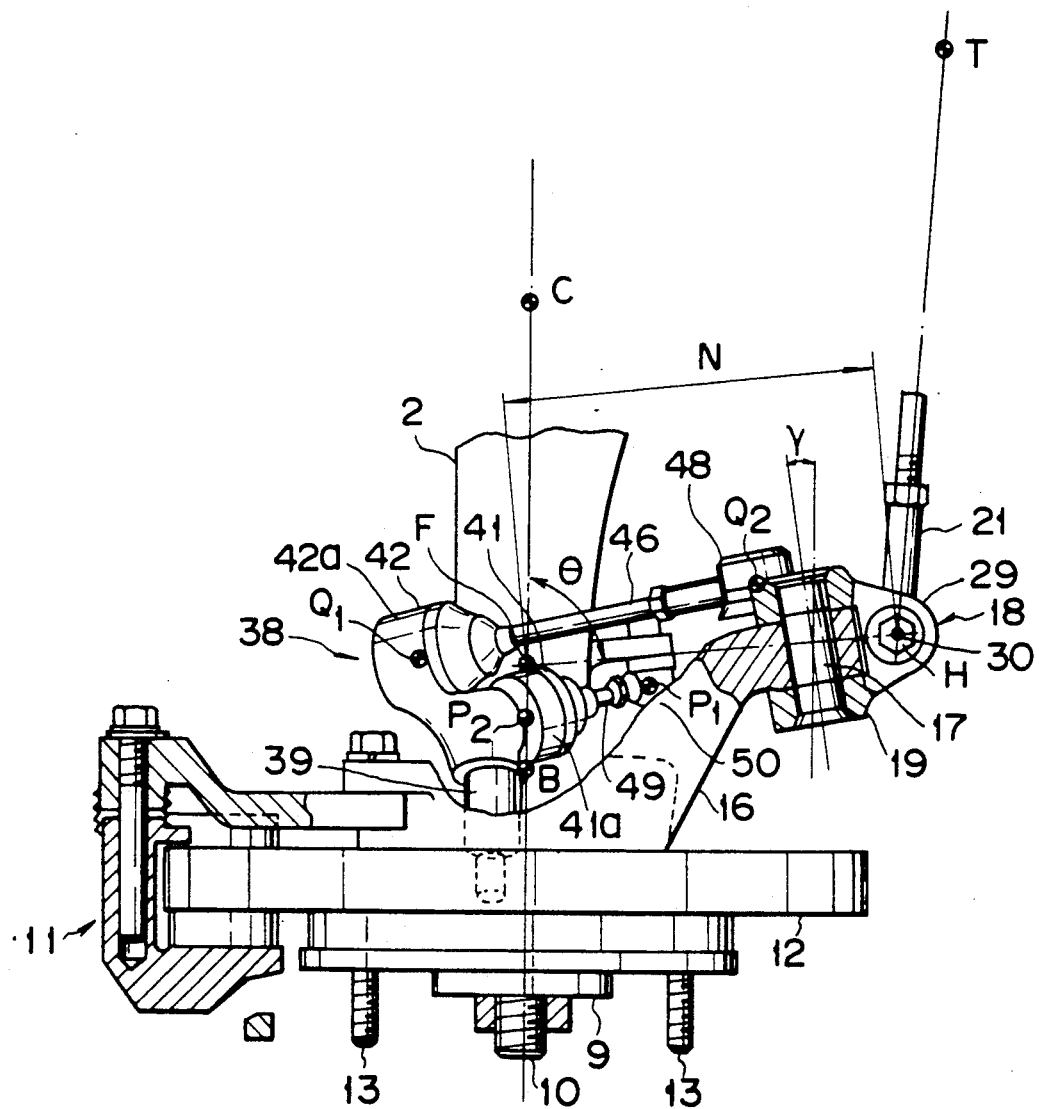

As shown in FIGS. 1 to 3, a cylindrical center boss 3c is formed at the central portion of the knuckle 3. The outer housing of a bearing 8 is fitted in the inner circumferential surface of the center boss 3c. The inner housing of the bearing 8 is fitted on the outer circumferential surface of a wheel hub 9. Thus, the knuckle 3 rotatably supports the wheel hub 9 through the bearing 8. The output end of a drive shaft 10 is fitted in the central portion of the wheel hub 9. The wheel hub 9 is rotated upon reception of driving force from the drive shaft 10. A brake disc 12 in a disk brake unit 11 is fixed by bolts (not shown) to an annular flange 9a formed on the wheel hub 9. In addition, a wheel body 15 of the front wheel 5 is fixed to the wheel hub 9 by wheel nuts 14 and hub bolts 13 extending from the annular flange portion 9a.

Figure 4:
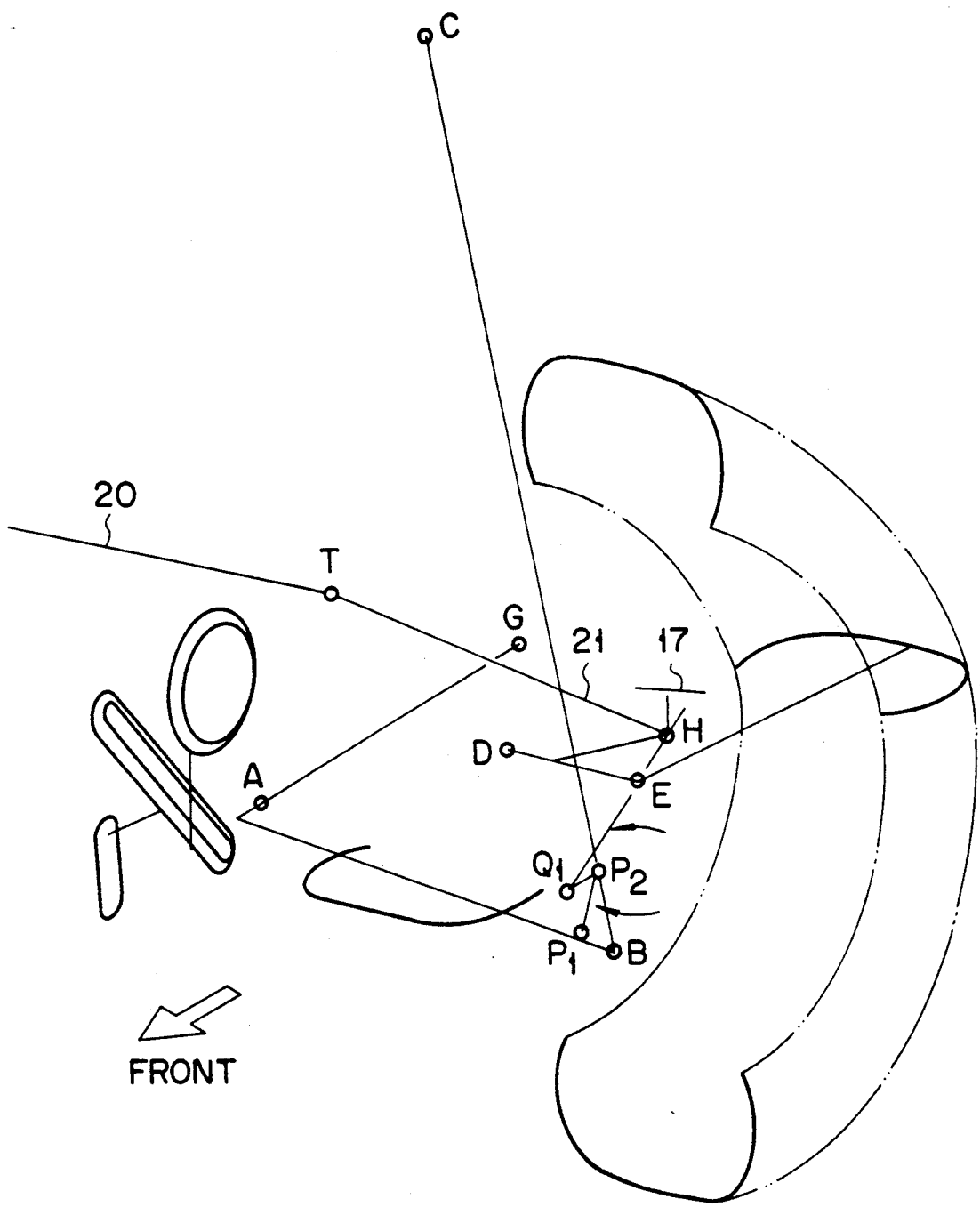

The knuckle 3 has a knuckle arm 16 extending backward along the vehicle body, as shown in FIGS. 2 and 3. An inverted L-shaped auxiliary link 18 is rotatably supported on the distal end of the knuckle arm 16 through a shaft 17. The shaft 17 is inclined at an angle $\gamma$ in the horizontal plane with respect to the width direction of the vehicle body, as shown in FIG. 3. The auxiliary link 18 has a joint yoke 19 at its intermediate portion, which is rotatable about the shaft 17. The outer end of a tie rod 21, which is movable in the width direction of the vehicle body, is connected to the rear end of the auxiliary link 18 through a ball joint 22 while the inner end of the tie rod 21 is connected to the outer end of a rack 20 of the steering unit as shown in FIG. 4. The shaft 17, the auxiliary link 18, and the ball joint 22 constitute a changing mechanism 23.

The changing mechanism 23 will be described in detail.

Figure 5:
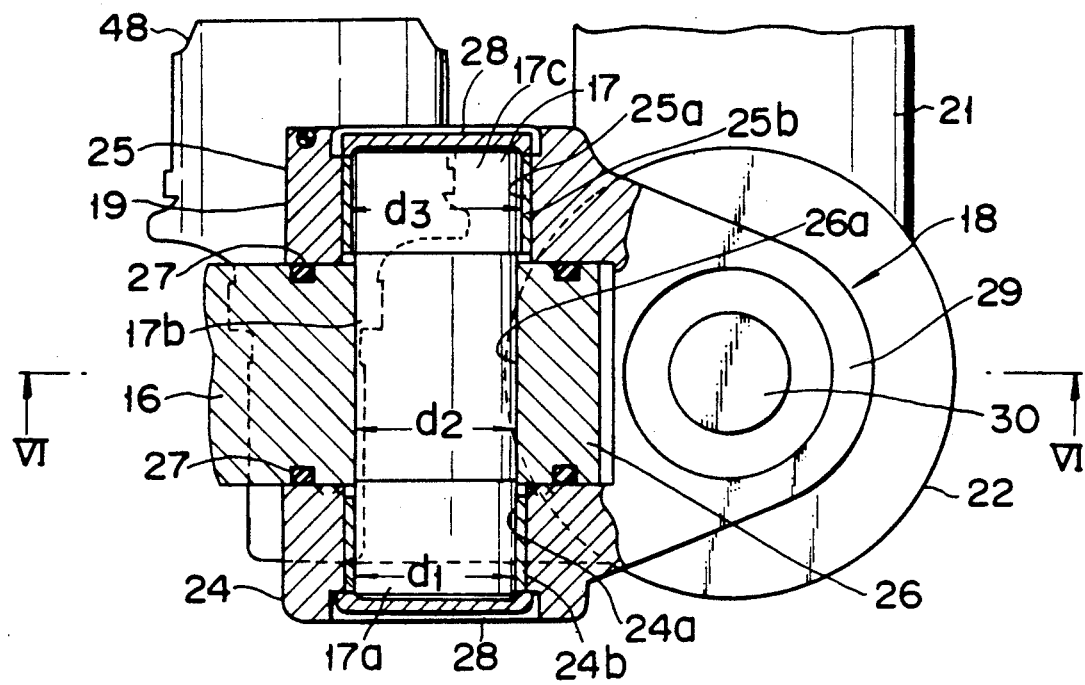

As shown in FIG. 5, a connecting end portion 26 formed at the distal end of the knuckle arm 16 is inserted between forked connecting portions 24 and 25 which constitute the joint yoke 19 of the auxiliary link 18. Insertion holes 24a, 25a, and 26a for receiving the shaft 17 are formed in the connecting portions 24 and 25, and the connecting end portion 26, respectively. The shaft 17 has a first shaft portion 17a having a diameter d1 corresponding to the insertion hole 24a, a second shaft portion 17b having a diameter d2 corresponding to the insertion hole 26a, and a third shaft portion 17c having a diameter d3 corresponding to the insertion hole 25a, which are aligned in this order from the distal end side in the insertion direction. The diameters d1, d2, and d3 satisfy the following condition:

$$d1<d2<d3$$

Ring-like bushes 24b and 25b are fitted in the insertion holes 24a and 25a, respectively. The shaft 17 is fitted into the insertion holes 24a and 25a through the bushes 24b and 25b. A lubricant such as grease is applied to sliding surfaces between the shaft 17 and the bushes 24b and 25b. In this manner, the auxiliary link 18 is rotatably supported by the shaft 17 fitted into the knuckle arm 16 under pressure.

Annular insertion grooves are respectively formed on those surfaces of the connecting end portion 26 of the knuckle arm 16 which contact with the connecting portions 24 and 25 of the joint yoke 19, so as to surround the shaft 17. Seal members 27 are fitted in these insertion grooves. Caps 28 are fitted on both end portions of the shaft 17 to prevent leakage of the lubricant and entrance of dust.

Figure 6:
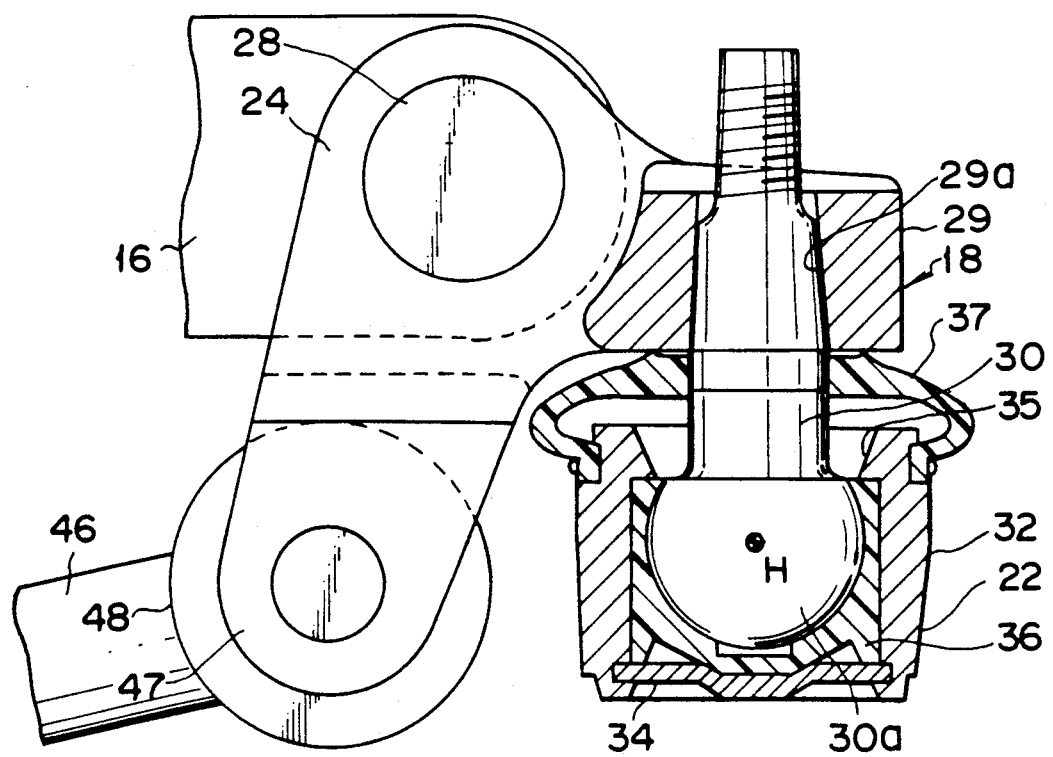

The auxiliary link 18 has a backward extension 29 extending backward from the joint yoke 19. This backward extension 29 has a tapered insertion hole 29a, as shown in FIG. 6. A stud 30 of the ball joint 22 is inserted in the hole 29a. The ball joint 22 is fixed to the auxiliary link 18 by a fastening nut 31 threadably engaged with the distal end of the stud 30. The stud 30 is integrally provided at its lower end with a ball portion 30a which is housed in a joint case 32. The joint case 32 is coupled with the outer end of the tie rod 21, and a lower opening of the case 32 is closed by a closing member 34. At the upper end of the joint case 32 is formed a tapered surface which constitutes a stopper 35 for regulating a swinging range of the stud 30. In addition, a holding member 36 for holding the ball portion 30a is fitted in the joint case 32, and a lubricant such as grease is filled in the joint case 32. A flexible cover 37 is provided between the outer surface of the stud 30 and the upper portion of the joint case 32 to prevent dust from entering into the case 32.

Figure 7:
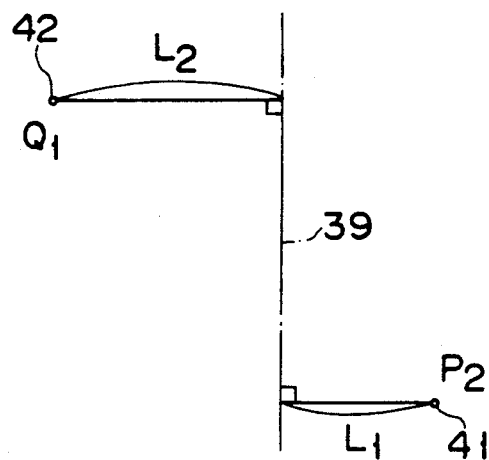

As shown in FIGS. 1 to 3, a rotor 38 with a rotational shaft 39 extending from the intermediate portion thereof is rotatably supported on the knuckle 3 through the shaft 39 and located inside the lower arm portion 3a of the knuckle 3. The shaft 39 is inclined at an angle $\alpha$ with respect to the width direction of the vehicle body in a vertical plane extending in the width the direction and is substantially perpendicular to the line BC as the king pin axis. First and second ball joints 41 and 42 are mounted on the rotor 38 and located on both sides of the shaft 39. Joint cases 41a and 42a of the ball joints 41 and 42 are formed integrally with the rotor 38. As shown in FIG. 7, a center P2 of rotation of the first ball joint 41 is offset backward from the center axis of the shaft 39 by a predetermined distance L1 and is located near the line CB as the king pin axis. A center Q1 of rotation of the second ball joint 42 is offset forward from the center axis of the shaft 39 by a predetermined distance L2. The ball joints 41 and 42 are positioned such that the offset amount L1 of the rotational center P2 is larger than the offset amount L2 of the rotational center Q1.

Figure 8:
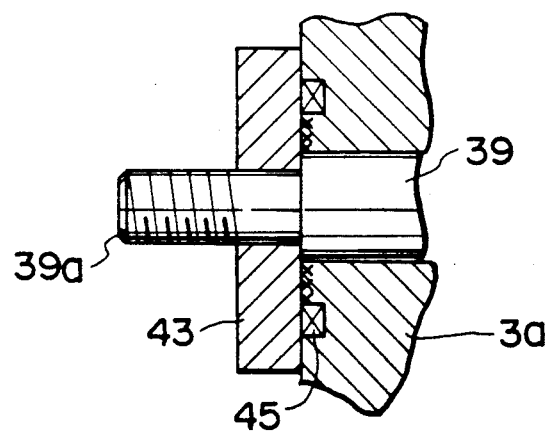

As shown in FIGS. 1 and 8, the outer end of the rotational shaft 39, which extends from the outer surface of the knuckle 3 is formed with a male threaded portion 39a. A fastening nut 44 is threadably engaged with the portion 39a through a washer 43. In this state, the rotor 3B is rotatably mounted on the lower arm portion 3a of the knuckle 3. Annular insertion grooves are formed on those surfaces of the lower arm portion 3a which are in contact with the washer 43 and the rotor 38, so as to surround the shaft 39. Seal members 45 are fitted in these insertion grooves. The seal members 45 prevent leakage of the lubricant such as grease applied to the sliding surfaces between the shaft 39 and an insertion hole formed in the knuckle 3, and prevent entrance of dust. The insertion grooves and the seal members 45 may be provided in the washer 43 and the rotor 38.

Figure 9:
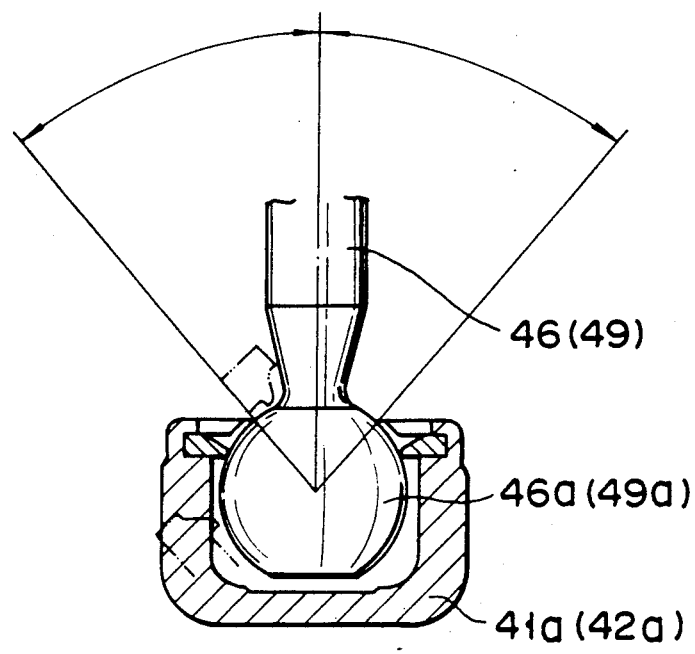

As shown in FIGS. 2 and 3, the front end of a control link 46 is connected to the second ball joint 42, and the rear end of the link 46 is connected to the auxiliary link 18. More specifically, the auxiliary link 18 has a downward extension 47 extending downward from the joint yoke 19. The rear end of the control link 46 is connected to a case of a ball joint 48 fixed to the distal end of the downward extension 47. A ball portion 46a is formed integrally with the front end of the control link 46a, as shown in FIG. 9. The ball portion 46a is housed in the joint case 42a integrally formed with the rotor 38 and is pivotable within an appropriate angular range.

As shown in FIGS. 1 to 3, the upper end of a vehicle height detection link 49 is connected to the first ball joint 41 of the rotor 38, and the lower end of the link 49 is connected to a case of a ball joint 50 provided on the outer end portion of the lower arm 2. More specifically, the upper end of the detection link 49 is formed integrally with a ball portion 49a in the same manner as the front end of the control link 46. The ball portion 49a is housed in the joint case 41a integrally formed with the rotor 38 and is pivotable within an appropriate angular range. The rotor 38, the ball joints 41, 42, 48, and 50, the control link 46, and the vehicle height detection link 49 constitute a control mechanism 51 for controlling the changing mechanism 23.

The vehicle height detection link 49 is arranged so as to rotate the rotor 38 about the shaft 39 in accordance with a vertical movement of the lower arm 2 upon the up-and-down movement of the front wheel 5 in relation to the vehicle body. The control link 46 can be moved in the longitudinal direction of the vehicle body in interlock with the rotation of the rotor 38, thereby rotating the auxiliary link 18 about the shaft 17. Therefore, the position of a center H (i.e., the outer end position of the tie rod 21) of the ball joint 22 relative to the knuckle 3 changes, so that a substantial knuckle arm length N (i.e., the distance between the king pin axis CB and the center H, as shown in FIG. 3), a substantial knuckle arm mounting angle 8 (i.e., an angle defined between the width direction of the vehicle body and a line FH as a substantial knuckle arm axis within the horizontal plane, as shown in FIG. 3), and a substantial tie rod length (i.e., a component of the length of the tie rod 21 in the width direction of the vehicle body, which length of the tie rod 21 varies upon swinging of the tie rod about its inner end) can be changed. As a result, the turning angle of the wheel 5 in response to the movement the tie rod 21 in the width direction of the vehicle body can be controlled in accordance with the vertical movement of the wheel 5, i.e., in accordance with changes in the vertical stroke of the suspension mechanism. In this case, actual changes in the turning angle under this control mainly depend on a substantial change in the knuckle arm length N. The vehicle height detection link 49, the rotor 38, the control link 46, and the auxiliary link 18 are arranged such that the substantial knuckle arm length N becomes the shortest (i.e., such that the ball joint 42 movable along with the rotor 38 is located at the position wherein the ball joint 22 is located at its frontmost position) in a neutral state (in a state of less passengers) of the wheel 5 with respect to the vertical movement thereof.

The operation of the first embodiment having the above-mentioned construction will be described.

The operation will be described with in a case where the suspension mechanism is moved from the neutral position (shown in FIGS. 1 to 4) in a bump direction (i.e., in a direction BM in FIG. 1). When the lower arm 2 is pivoted upward about the center A in FIG. 1, and angle between the lower arm 2 and the lower arm portion 3a of the knuckle arm 3 increases, and the distance between the ball joint 50 and the rotational shaft 39 increases. Since the ball joint 50 and the shaft 39 are connected to each other through the vehicle height detection link 49, the ball joint 41, and the rotor 38, the movement of the lower arm 2 is transmitted to the rotor 38 through the ball joint 50, the link 49, and the ball joint 41. Thus, the rotor 38 is rotated counterclockwise (in FIG. 2) about the shaft 39. The angular displacement of the rotor 38 is transmitted to the auxiliary link 18 through the ball joint 42, the control link 46, and the ball joint 48. At this time, the control link 46 is moved backward, and thus the auxiliary link 18 is rotated counterclockwise (in FIG. 2) about the shaft 17. Accordingly, the outer end of the tie rod 21 connected to the auxiliary link 18 through the ball joint 22 moves backward, and the substantial knuckle arm length N which corresponds to the distance between the center H of the ball joint 22 and the king pin axis (CB line) is increased.

Therefore, the turning angle of the wheel 5 caused in response to the tie rod output is reduced.

When the suspension mechanism is moved from the neutral position shown in FIGS. 1 to 4 in the rebound direction (i.e., in the direction RB in FIG. 1), the rotor 38 is rotated clockwise in FIG. 2. In this case, however, the rotation of the rotor 38 also causes a backward movement of the control link 46, and thus the auxiliary link 18 is rotated counterclockwise in FIG. 2. For this reason, in the same manner as described above, the substantial length N of the knuckle arm 16 increases, and the turning angle of the wheel 5 caused in response to the tie rod output is reduced.

In the embodiment described above, the substantial knuckle arm length N increases with the stroke of the suspension. Hence, the maximum angle, by which the wheels can be turned when the suspension stroke is great, is relatively small. Even if the maximum wheel-turning angle, which is optimal for the suspension in the neutral state, is set greater than that of a vehicle having the conventional strut suspensions, the wheels remain out of contact with the chassis frame when they tilt toward the chassis frame due to a great suspension stroke. Therefore, the steering angle control apparatus according to this embodiment serves to reduce the minimum turning diameter of the vehicle. It is in a parking lot or on a narrow road that the driver steers the vehicle sharply. While the vehicle is traveling in a parking lot or on a narrow road, the suspension stroke seldom increases very much. In view of this, to reduce the maximum wheel-turning angle in inverse proportion to the suspension stroke does not matter at all.

Figure 10:
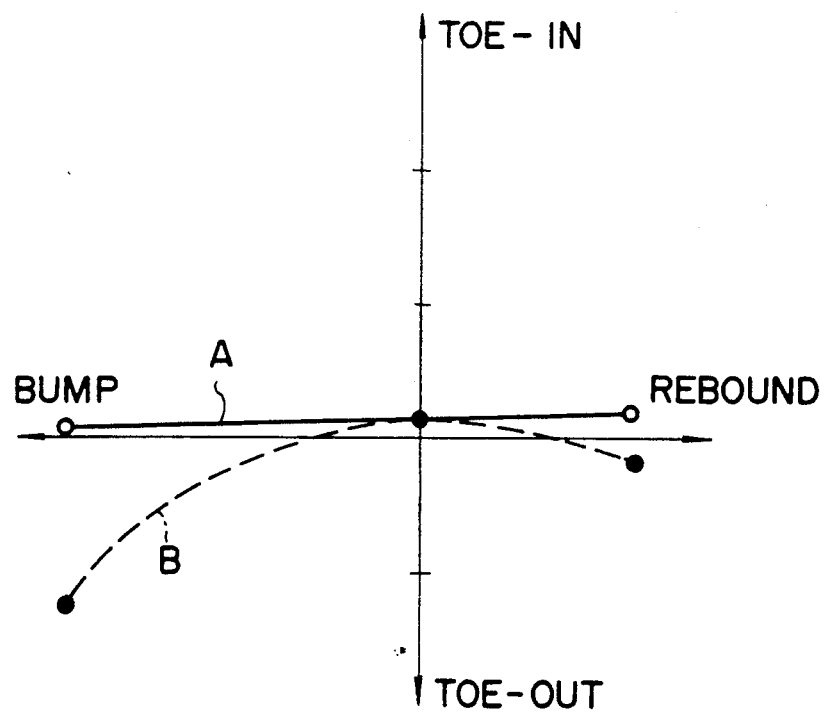

The steering angle control apparatus described above also controls the toe-angle of the front wheel set in the neutral position. FIG. 10 represents the toe-angle characteristic (the solid line A) of the suspension mechanism having the steering angle control apparatus, which is the relationship between the toe angle of a wheel and the suspension stroke. FIG. 10 also shows the toe-angle characteristic (the broken line B) of the conventional strut suspensions. As is evident from FIG. 10, the wheels never undergoes an excessive toe-out, unlike those of the vehicle having the conventional strut suspensions, since the steering angle control apparatus reduces the turning angle of the wheel when the suspension stroke is great. Obviously, the steering angle control apparatus of the embodiment impart the vehicle both a high steering stability and a high steering efficiency.

In the above embodiment, the operation of decreasing the turning angle of the front wheel is performed by using only a mechanical structure without requiring any hydraulic or electronic control. Therefore, the control apparatus is simple in construction and low in manufacturing cost, and has high reliability.

Since the turning angle of the front wheel caused in response to the tie rod output is controlled by varying the substantial knuckle arm length N, the wheel alignment such as the camber and the caster does not extremely change in accordance with the controlled state of the turning angle. For this reason, high driving stability can be assured, and a conventional suspension arms and the like can be used without any modifications.

The offset amount of the first ball joint 41 (on the input side) of the rotor 38 with respect to the rotational shaft 39 is smaller than that of the second ball joint 42 (on the output side) of the rotor (i.e., L2 < L1). For this reason, a small displacement of the vehicle height detection link 49 can be amplified, and the amplified displacement is transmitted to the control link 46 and the auxiliary link 18, thereby improving the operation efficiency of the turning angle control. The construction around the vehicle height detection link 49 serving as an input link can be made compact, so that even in a case wherein the space around the front wheels is narrow as in FF cars, the control apparatus can be arranged in the limited space.

The rotational shaft 39 is formed integrally with the rotor 38, and at the same time the joint cases 41a and 42a are also formed integrally with the rotor 38. In addition, the ball portions 46a and 49a are formed integrally with the control link 46 and the vehicle height detection link 49. For these reasons, the bending moment acting on the link mechanism can be decreased, and the construction around the rotor 38 can be made compact. Therefore, the control apparatus can be advantageously made compact.

The rotational shaft 39 of the rotor 38 is disposed in a direction substantially perpendicular to the king pin axis (line CB), and the center P2 of rotation of the first ball joint 41 is located near the king pin axis. The offset amount of the point P2 is set to be small. Therefore, a change in wheel alignment upon steering in the neutral state (almost in a state of less passengers) of the suspension can be suppressed, and stable suspension performance can be advantageously assured.

FIGS. 11 to 14 show a second embodiment of the present invention. The same reference numerals as in the first embodiment denote the same parts in the second embodiment, and the detailed description thereof will be omitted.

In the second embodiment, a vehicle height detection link 49, a rotor 38, a control link 46, and an auxiliary link 18 are constructed and arranged such that the substantial knuckle arm length has the smallest value in the substantially neutral state (in a state of less passengers) of the front wheel 5 with respect to the vertical movement thereof. The rotor 38 is rotated counterclockwise and clockwise in FIG. 12 when the suspension mechanism moves in the bump and rebound directions, respectively. In either case, the control link 46 is moved backward to increase the substantial knuckle arm length, thus obtaining substantially the same effect as in the first embodiment. In addition, in the second embodiment, the offset amounts of first and second ball joints 41 and 42 with respect to the rotational shaft 39 have a relationship opposite to that in the first embodiment. The construction in the second embodiment is advantageous for the case wherein a large control amount is not required.

As the rear end of the control link 46 is directly supported on the case of a ball joint 22, the construction of the auxiliary link 18 can be simplified.

Figure 11:
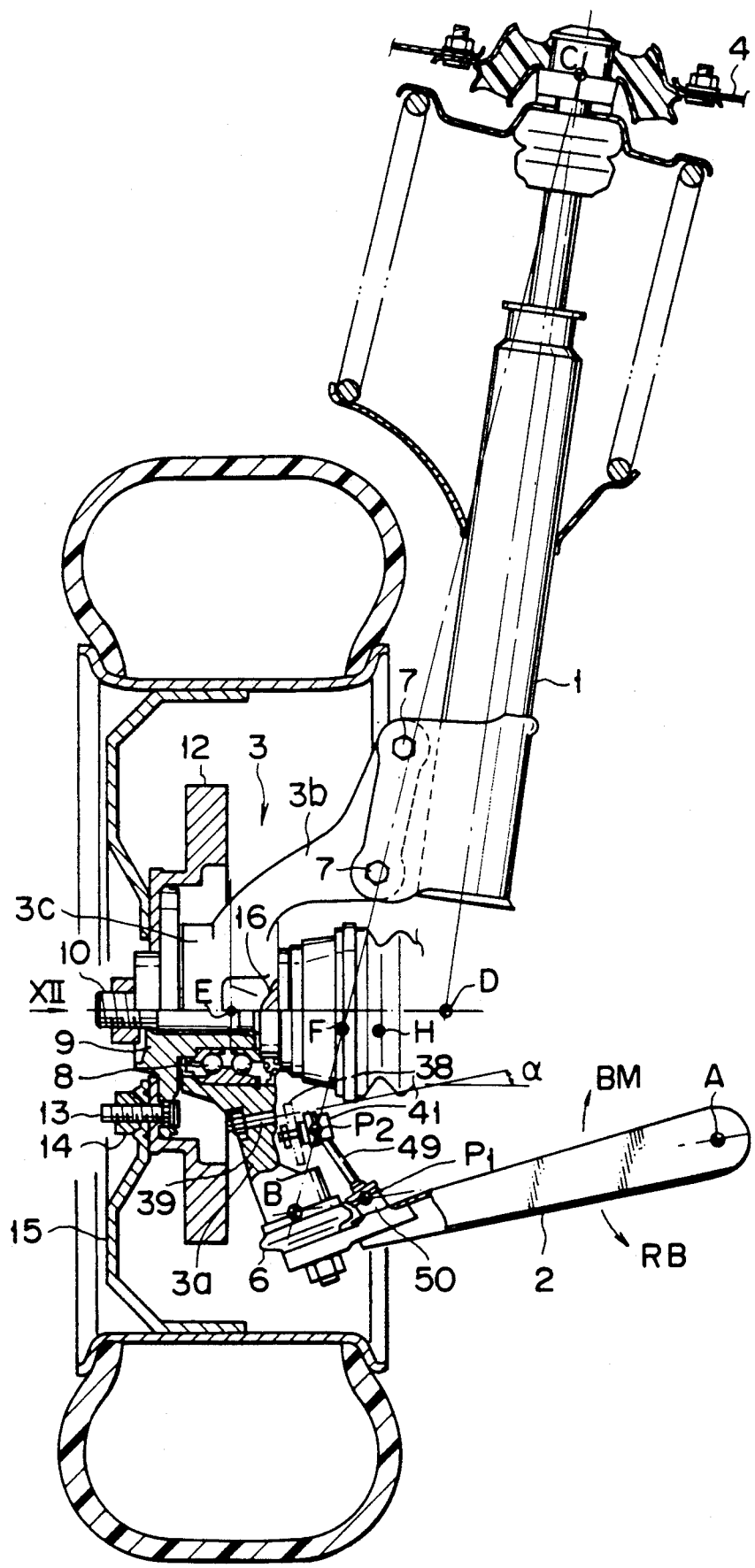
Figure 12:
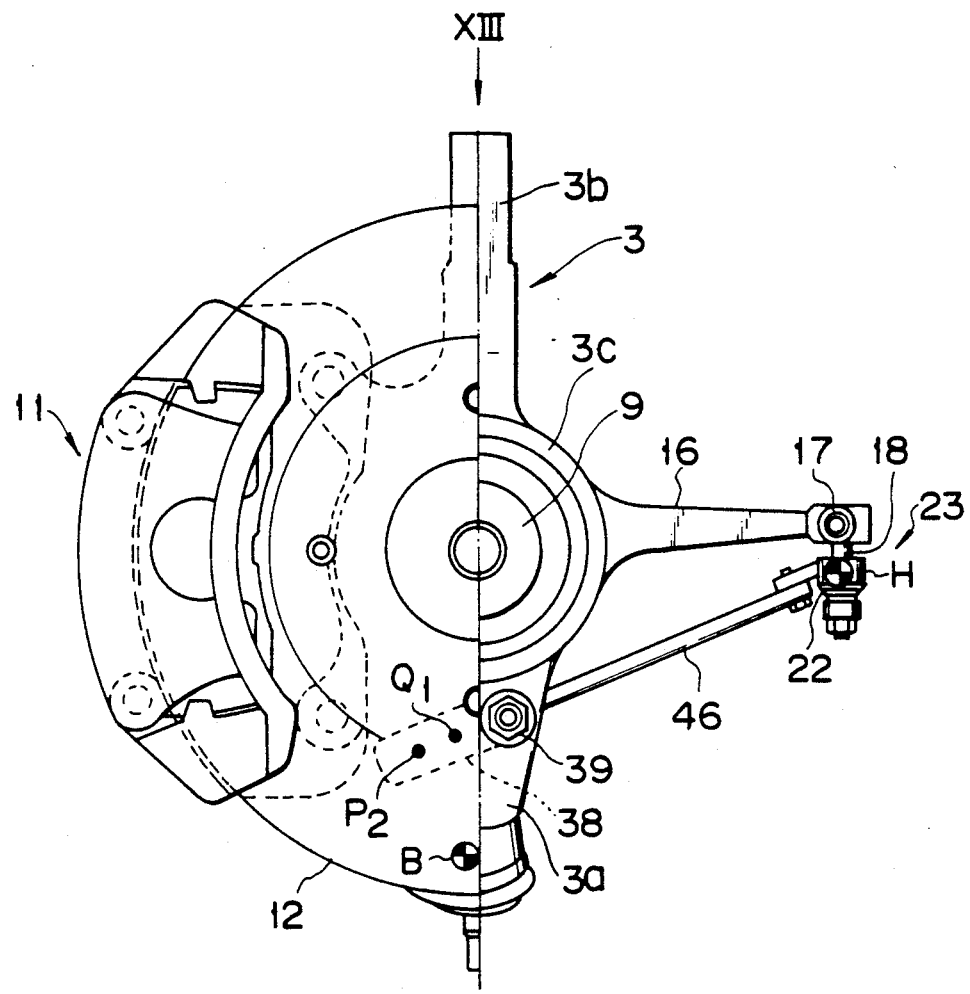
Figure 13:
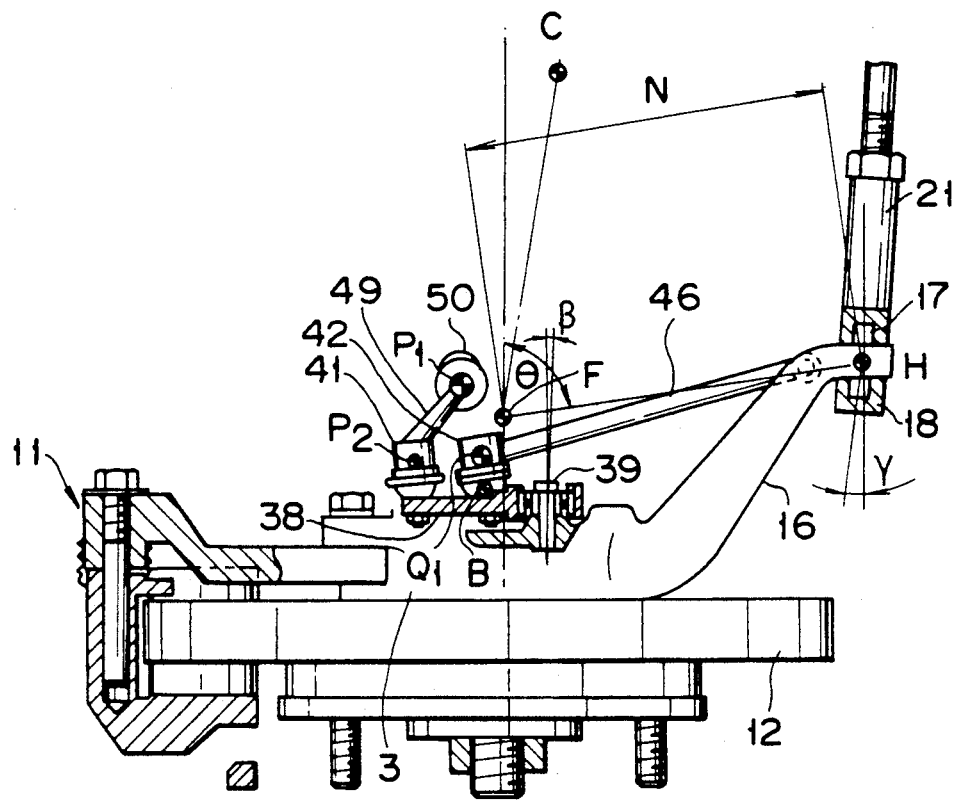
Figure 14:
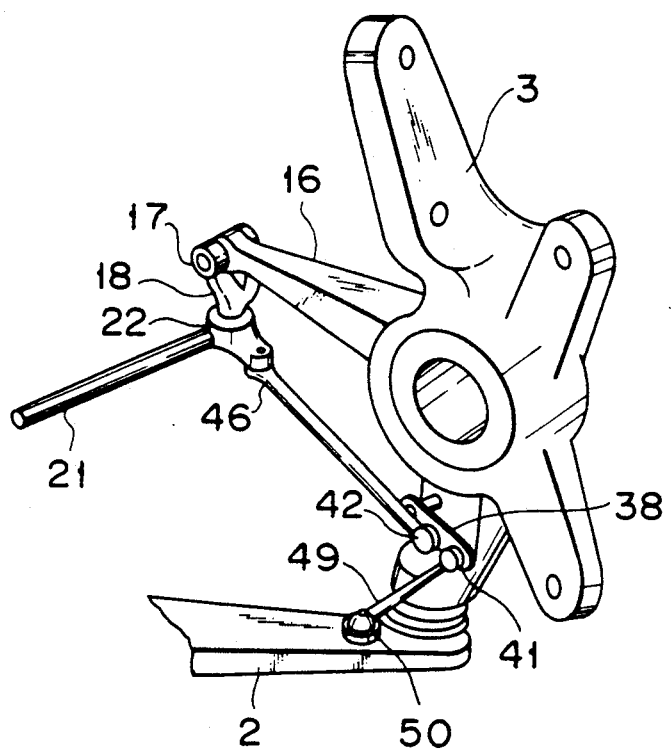

In the second embodiment, as shown in FIG. 11, a ball joint 50 is located on a line extending through the mounting portion A of the lower arm 2 on the vehicle body and the center B of a ball joint 6, thereby obtaining a smooth operation.

A mounting angle $\alpha$ of the rotational shaft 49 and a mounting angle $\gamma$ of a shaft 17 of the auxiliary link 18 are set in a direction opposite to those in the first embodiment. Further, in the horizontal plane, the shaft 39 is inclined by an angle $\beta$ to the width direction of the vehicle body.

Figure 15:
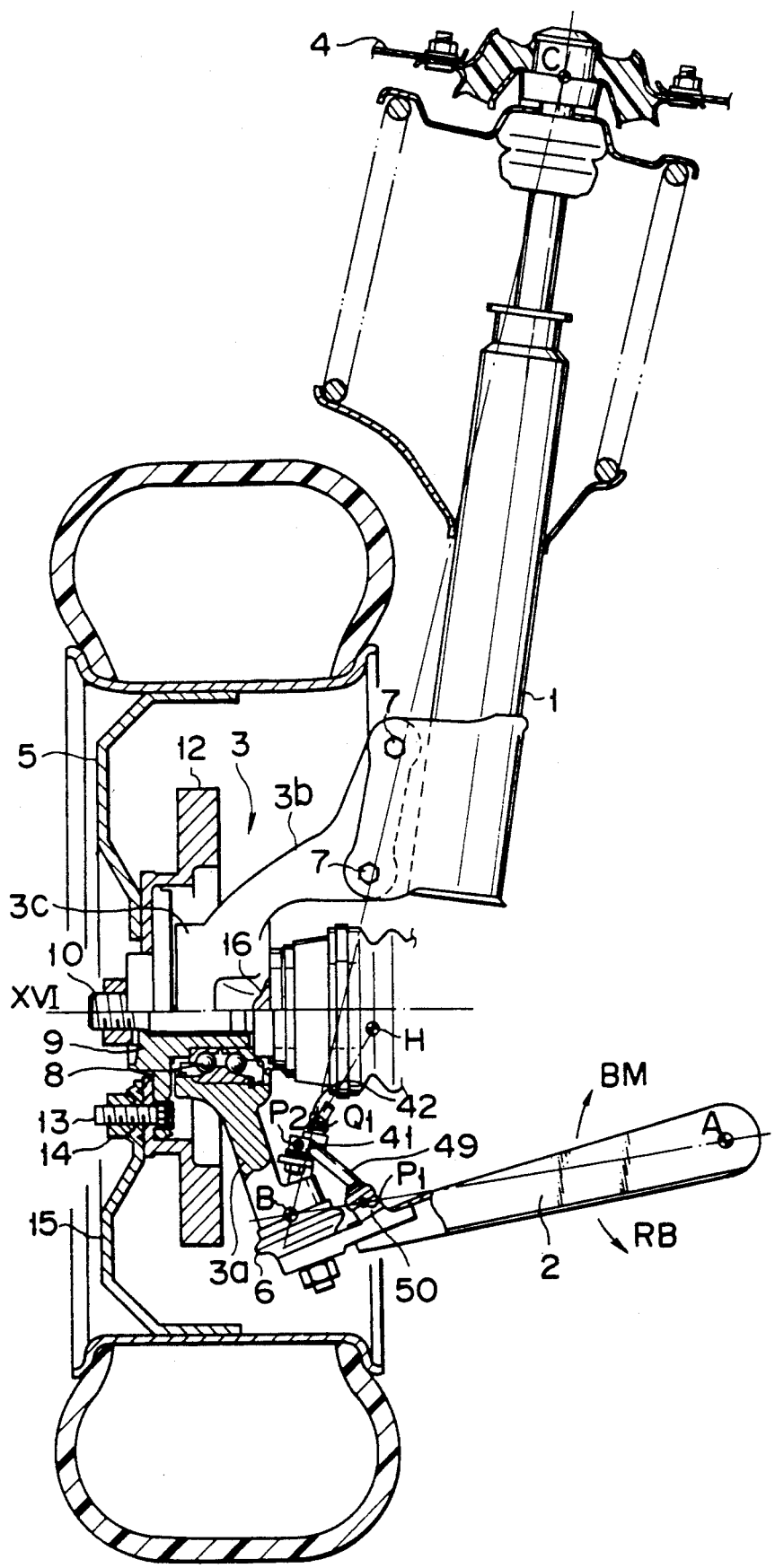
Figure 17:
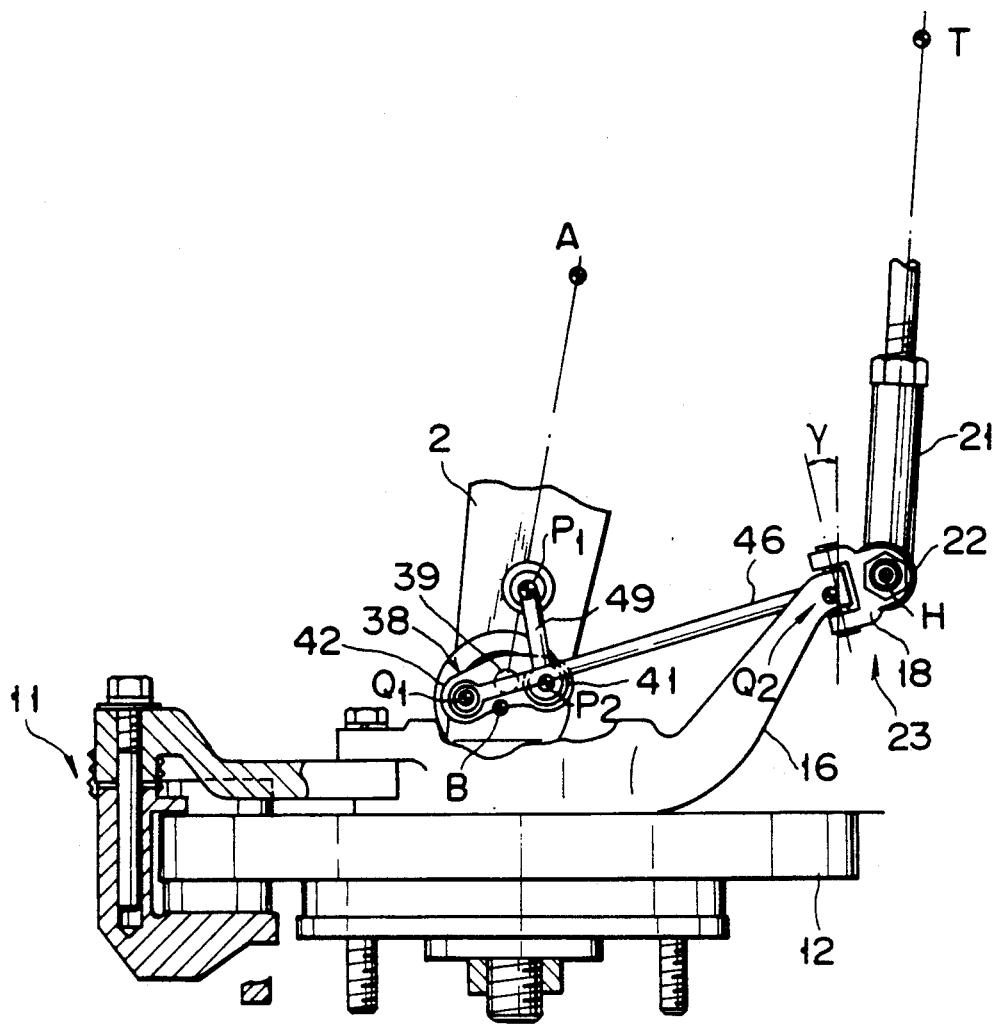
Figure 18:
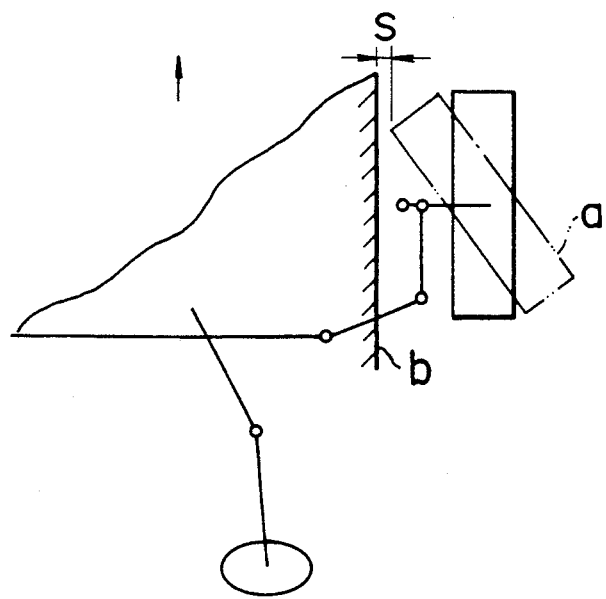
FIG. 18 is a view for explaining a relationship between the wheels and the vehicle body at the maximum steering angle.

FIGS. 15 to 17 show the third embodiment of the present invention. The same reference numerals as in the first embodiment denote the same parts in the third embodiment, and the detailed description thereof will be omitted.

According to the third embodiment, a rotational shaft 39 of a rotor 38 is located on a king pin axis (line CB). Thus, the rotor 38 is rotated about the king pin axis upon the vertical movement of a front wheel 5 and controls the operation of an auxiliary link 18. More specifically, also in the third embodiment, the components of the apparatus are arranged such that the substantial knuckle arm length becomes shortest in the neutral state of the wheel 5. The rotor 38 is rotated counterclockwise and clockwise in FIG. 17 as the wheel 5 moves in the bump and rebound directions, respectively. In either case, a control link 46 is moved backward to increase the substantial knuckle arm length, and therefore, substantially the same effect as in the first and second embodiments described above can be obtained in the third embodiment.

In each embodiment described above, the angle $\gamma$ of the shaft 17 is set so as to smoothly and effectively perform the displacement control of the ball joint 22 by means of the control arm 46 without interference with the displacement of the tie rod 21. By changing this angle $\gamma$, control response can be adjusted. The angles $\alpha$ and $\beta$ of the rotational shaft 39 of the rotor 38 are set so as to smoothly and efficiently transmit the displacement of the vehicle height detection arm 49 to the auxiliary link 18 through the control link 46 without causing link interference. In either case, by appropriately determining the above angles, lengths of the rotor and links, their positions, and the like, the problem posed by link interference or the like can be solved to obtain desired characteristics.

The present invention is not limited to the particular embodiments described above and various changes and modifications may be made without departing from the scope of the present invention.

For example, as the control means, it is possible to use an actuator for controlling the position of the outer end of the tie rod relative to the knuckle, in accordance with electrically detected vertical movement of the wheel, or to use an actuator for converting the vertical movement of the wheel into hydraulic force and controlling the relative position of the outer end of the tie rod by using this hydraulic force. The shaft 17 and the ball joint 22 in the changing mechanism may be connected to the outer end of the tie rod 21 and the knuckle arm 16, respectively. In this case, the same function can be obtained. In addition, the above embodiments exemplify applications of the front suspensions. However, the present invention is also applicable to a rear suspension.

What is claimed is:

1. A steering angle control apparatus for use in a vehicle including a knuckle having a knuckle arm, for rotatably supporting a wheel, suspension means for supporting said knuckle on a vehicle body so as to be movable substantially in the vertical direction and rotatable together with the wheel about a predetermined steering axis, and steering means including a tie rod having an outer end connected to the knuckle arm, for turning the knuckle and wheel through the tie rod, said apparatus comprising:
   a changing mechanism for connecting said knuckle arm and said outer end of said tie rod to each other so that the relative position therebetween is variable; and
   control means for actuating the changing mechanism in accordance with changes in a suspension stroke of the suspension means substantially in the vertical direction.

2. An apparatus according to claim 1, wherein said changing mechanism connects the outer end of the tie rod and the knuckle arm such that the distance between the outer end of the tie rod and the predetermined steering axis varies in accordance with changes in the relative position between the outer end of the tie rod and the knuckle arm.

3. An apparatus according to claim 2, wherein said first end of the auxiliary link comprises a ball joint connected to the outer end of the tie rod.

4. An apparatus according to claim 1, wherein said changing mechanism comprises an auxiliary link connected to the control means, the auxiliary link having a first end pivotally connected to one of the outer end of the tie rod and the knuckle arm, and a second end connected to the other of the outer end of the tie rod and the knuckle arm to be rotatable about a rotational axis extending substantially in the width direction of the vehicle body.

5. An apparatus according to claim 4, wherein said rotational axis is located on a horizontal plane and inclined at a predetermined angle to the width direction of the vehicle body.

6. An apparatus according to claim 4, wherein said outer end of the tie rod is located below the knuckle arm.

7. An apparatus according to claim 1, wherein said control means comprises a rotor rotatably mounted on the knuckle, a vehicle height detection link connected between the rotor and the suspension means to rotate the rotor in accordance with changes in the vertical stroke of the suspension means, and a control link connected between the rotor and the changing mechanism to actuate the changing mechanism in response to the rotation of the rotor.

8. An apparatus according to claim 7, wherein said rotor is arranged below an axle of the wheel.

9. An apparatus according to claim 7, wherein said rotor is mounted on the knuckle to be rotatable about a rotational axis located on a vertical plane extending in the width direction of the vehicle body.

10. An apparatus according to claim 9, wherein said rotational axis of the rotor is inclined at a predetermined angle to the width direction of the vehicle body.

11. An apparatus according to claim 7, wherein said rotor is mounted on the knuckle to be rotatable about a rotational axis extending substantially in the vertical direction.

12. An apparatus according to claim 7, wherein the connecting portion between said rotor and said vehicle height detection link is located near the steering axis.

13. An apparatus according to claim 7, wherein the distance between a rotational axis of said rotor and the connecting portion between the rotor and the vehicle height detection link is smaller than the distance between the rotational axis of the rotor and the connecting portion between the rotor and the control link.

14. An apparatus according to claim 7, wherein said suspension means includes a lower arm connected to the knuckle, and said vehicle height detection link is connected between the rotor and the lower arm.

15. An apparatus according to claim 1, wherein said suspension means includes a strut assembly having a lower end connected to the knuckle and an upper end connected to the vehicle body.

16. An apparatus according to claim 1, wherein said control means includes means for decreasing the turning angle of the wheel, which is caused by an operation of the steering means, in accordance with an increase in the vertical stroke of the suspension means in a state wherein said suspension means is displaced to a region near a stroke limit thereof.

17. An apparatus according to claim 1, wherein said outer end of the tie rod is located on the rear side of the steering axis of the knuckle, and said control means includes means for operating the changing mechanism to increase the distance between the steering axis and the outer end of the tie rod in accordance with an increase in the vertical stroke of the suspension means.

18. A steering angle control apparatus for use in a vehicle including a knuckle having a knuckle arm, for rotatably supporting a wheel, suspension means for supporting said knuckle on a vehicle body so as to be movable substantially in the vertical direction and rotatable together with the wheel about a predetermined steering axis, and steering means including a tie rod having an outer end connected to the knuckle arm, for turning the knuckle and the wheel through the tie rod, said apparatus comprising:

a rockable auxiliary link for connecting said knuckle arm and said outer end of said tie rod to each other so that the relative position therebetween is variable; and control means for actuating the auxiliary link in accordance with changes in a suspension stroke of the suspension means substantially in the vertical direction, said control means including a rotor rotatably mounted on the knuckle, a vehicle height detection link connected between the rotor and the suspension means so as to rotate the rotor in accordance with changes in the vertical stroke of the suspension means, and a control link for rocking the auxiliary link in response to the rotation of the rotor.

* * * * *